US010712618B2

(12) United States Patent
Kwok et al.

(10) Patent No.: US 10,712,618 B2
(45) Date of Patent: Jul. 14, 2020

(54) ELECTROOPTIC DEVICE BASED ON MULTIPLE DOMAIN SCATTERING EFFECT

(71) Applicant: The Hong Kong University of Science and Technology, Hong Kong (CN)

(72) Inventors: Hoi Sing Kwok, Hong Kong (CN); Martin Schadt, Seltisberg (CH); Fan Fan, Changsha (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 15/909,649

(22) Filed: Mar. 1, 2018

(65) Prior Publication Data
US 2018/0259813 A1 Sep. 13, 2018

Related U.S. Application Data

(60) Provisional application No. 62/600,858, filed on Mar. 7, 2017.

(51) Int. Cl.
*G02F 1/1337* (2006.01)

(52) U.S. Cl.
CPC .. *G02F 1/133711* (2013.01); *G02F 1/133753* (2013.01); *G02F 1/133788* (2013.01); *G02F 2001/133738* (2013.01); *G02F 2001/133742* (2013.01); *G02F 2001/133761* (2013.01); *G02F 2001/133773* (2013.01)

(58) Field of Classification Search
CPC ......... G02F 1/133753; G02F 1/133788; G02F 2001/133773; G02F 2001/133742
See application file for complete search history.

(56) References Cited

U.S. PATENT DOCUMENTS

| 5,576,862 A * | 11/1996 | Sugiyama | G02F 1/133753 349/124 |
| 5,726,728 A * | 3/1998 | Kondo | G02F 1/133377 349/156 |
| 2007/0046869 A1* | 3/2007 | Lin | G02F 1/133753 349/114 |
| 2009/0279033 A1* | 11/2009 | Yoneya | G02F 1/133753 349/129 |

OTHER PUBLICATIONS

Kwok, H., et al., Progress in Liquid Crystal Science and Technology, Series on Liquid Crystals, 2013, 4:1-704, World Scientific Publishing Co. Pte. Ltd., Singapore.

(Continued)

*Primary Examiner* — Jessica M Merlin
(74) *Attorney, Agent, or Firm* — Saliwanchik, Lloyd & Eisenschenk

(57) ABSTRACT

Devices and method of fabrication a liquid crystal electro-optic device which is based on light scattering and diffraction from a multiple domain field-effect liquid crystal configuration are provided. The multiple domains include random liquid crystal alignment directions fabricated by photo-alignment and have sizes ranging from sub-micrometer to several micrometers. The random alignment in the plane can be of two or more directions whereas the pretilt angle can vary between zero and 90°. The randomness of the planar directions of the liquid crystal director can be generated by a designed photo mask in combination with uniaxial photo-alignment.

11 Claims, 6 Drawing Sheets

(56) References Cited

OTHER PUBLICATIONS

Chigrinov, V., et al., Photoalignment of Liquid Crystalline Materials: Physics and Applications, 2008, 1-231, John Wiley & Sons, Ltd., Chichester, England.

Coates, D., Development and applications of cholesteric liquid crystals, Liquid Crystals, 2015, 42(5-6): 653-665, Taylor & Francis Group.

Ji, W., et al., Large birefringence smectic-A liquid crystals for high contrast bistable displays, Optical Materials Express, Feb. 1, 2015, 5(2):261-266, Optical Society of America.

Schadt, M., et al., Optical patterning of multi-domain liquid-crystal displays with wide viewing angles, Letters to Nature, May 16, 1996, 381:212-215.

* cited by examiner

ELECTROOPTIC DEVICE BASED ON MULTIPLE DOMAIN SCATTERING EFFECT

CROSS-REFERENCE TO RELATED APPLICATION

This application claims the benefit of U.S. Provisional Application Ser. No. 62/600,858, filed Mar. 7, 2017, which is herein incorporated by reference in its entirety.

FIELD OF INVENTION

This invention deals with a field-effect mode of operation of a liquid crystal display and/or light shutter that is based on light scattering and diffraction by a multiple domain liquid crystal configuration.

BACKGROUND

Liquid crystal displays (LCDs) are dominant in the flat panel market. Almost all LCDs are based on nematic field effects. As such, LCDs acts as electro-optical polarization controllers. The nematic liquid crystal configurations in an LCD are aligned basically planar, vertically or twisted. The configurations serve to alter the polarization state of the incoming light. Light is transmitted or reflected between polarizers, depending on the polarization state of the output light from the liquid crystal configuration. Polarizers are essential for operation of LCD devices.

Except for the very small minority of liquid crystal devices, which are not based on nematic field-effects, all LCDs require two polarizers for operation. Exceptions are the cholesteric display (ChLCD) and the polymer dispersed liquid crystal display (PDLC). In case of ChLCDs, light is reflected, transmitted or scattered depending on the alignment of their short pitch cholesteric liquid crystals. In the case of PDLCs, random pockets of liquid crystals are formed inside a polymer matrix. The alignment state of these liquid crystal pockets determines whether PDLCs scatter or transmit incoming light.

The problem with ChLCD is that it does not provide enough broadband to cover the entire visible spectral range. In the reflective state, only a certain wavelength region such as green light is reflected. The other wavelengths are transmitted resulting in colored and angular dependent reflection. ChLCDs also require high driving voltages and are mostly operated in a bistable on-off mode. In case of PDLCs, light scattering occurs at all wavelengths with small wavelength dependence. However, the LC-domains are formed by random polymerization of a liquid crystal mixture doped with photo-sensitive monomers.

The polymerization process forms a polymer network comprising monomer liquid crystal pockets (droplets). The size and position of the pockets are random. In the zero volts scattering state, scattering is due to the refractive index mismatch between polymer matrix and liquid crystal. When a high voltage is applied across the liquid crystal/polymer layer, positive dielectric anisotropic liquid crystal molecules align parallel to the applied electric field. If the ordinary refractive index of the liquid crystal matches the refractive index of the polymer matrix and the liquid crystals are properly aligned only small residual scattering will occur, resulting in a clear transmissive state with little residual haze. However, the voltage required to change the alignment of the liquid crystal pockets into a truly clear state is very high (~50-100V). Moreover, since the size of the pockets or droplets of liquid crystal is random, the change between light-scattering and transmission is a very sluggish function of applied voltage, making multiplex driving impossible. Thus, PDLCs can only be used as single pixel devices and are therefore not suitable for display applications. These basic drawbacks prevent displaying adequate information contents and CMOS addressing of PDLCs. Moreover, the large driving voltage and rather thick PDLC-layers required for adequate light scattering further limits the applicability of PDLCs.

BRIEF SUMMARY

Embodiments of the subject invention provide an electronically tunable field-effect liquid crystal device that does not require any polarizers and therefore exhibits a bright, transmissive state. This device can be used as a display, or as an efficient light shutter, or as a smart window, or in other electro-optics applications. The principle of operation of the new device enables efficient light scattering and diffraction due to a uniquely designed and fabricated multi-domain liquid crystal configuration. The device exhibits minimal power consumption and small driving voltage. The liquid crystal domains are photo-patterned and each exhibits a designed orientation and geometry of its liquid crystal alignment. The orientation is not arbitrarily generated, but in a dedicated random process chosen such that a specific degree of randomness results in an optimal electro-optical performance (for example, light scattering efficiency, directionality of scattering, wavelength dependence). The alignment of the liquid crystal director within the domains can be basically planar or vertical. Moreover, the orientation of planar alignment and/or the pre-tilt direction are controlled to be in two or more directions.

For the case that the DMS domains are basically planar aligned, the positive dielectric anisotropic nematic liquid crystal layer is scattering/diffracting in the zero-voltage state; whereas the layer becomes transparent in a high voltage state. Vice versa, in case of basically vertical aligned domains and negative dielectric anisotropic liquid crystals, the DMS liquid crystal film is clear (transmissive) in a zero-voltage state and scattering/diffracting in the high voltage state. Thus, the planar aligned DMS-LCDs correspond to normally off LCDs and vertically aligned DMS-LCDs correspond to normally on LCDs. MDS-LCDs comprise ordinary type nematic or doped nematic liquid crystal materials as used in standard LCDs.

The alignment directions of the domains are designed to have either two or more planar and/or tilted vertical directions. The assignment of the alignment direction is through a random masking pattern by design.

Embodiments of the subject invention provide a means for fabricating multiple domain structures using photo-alignment of liquid crystals. One approach can include having (Azo-type) alignment layers be reoriented during the fabrication process. Another approach is photo-alignment by linear photo-polymerization (LPP) which simultaneously generates uniaxial alignment/patterning, defined pretilt of the liquid crystal director and fixation of the alignment.

DETAILED DESCRIPTION

Embodiments of the subject invention provide a liquid crystal display mode which does not require any polarizers and differs from any other polarizer free liquid crystal display, such as ChLCDs or PDLCs. The differences include the multiple-domain liquid crystal configuration(s), the operating principle, and improved electro-optical performance. Embodiments are based on a designed surface aligned multiple domain structure (MDS) which generates dedicated light-scattering and light-diffraction in an adjacent liquid crystal film.

The randomness of the surface orientation of the liquid crystal domains is designed and controlled such that large optical contrast results between "on" and "off" state. The small driving voltage and the very low power consumption of a MDS LCD are comparable to those of matrix addressed LCDs. Moreover, MDS-LCDs exhibit well-defined and steep transmission-voltage characteristics and enable CMOS compatible multiplex drive.

Photo-alignment and alignment-patterning is used at least in one of the fabrication steps. Photoalignment (PA) generates the surface aligned multiple domain structures on which the light scattering of DMS-LCDs is based. There are basically three different types of photo-alignment technologies for liquid crystals, (1) linear photopolymerization (LPP-PA), (2) Azo-type photo-alignment (A-PA), (3) and photoalignment by polarized deep-UV depletion of polyimide (DUV-PA). With the exception of in-situ pre-tilt generation, which is only possible with the LPP-technology, any of these PA technologies is suitable.

A feature of certain embodiments of the subject invention is the use of photo-alignment and simultaneous photo-patterning of the liquid crystal alignment in the fabrication of our multi-domain (MDS)-liquid crystal devices.

Figure 1:
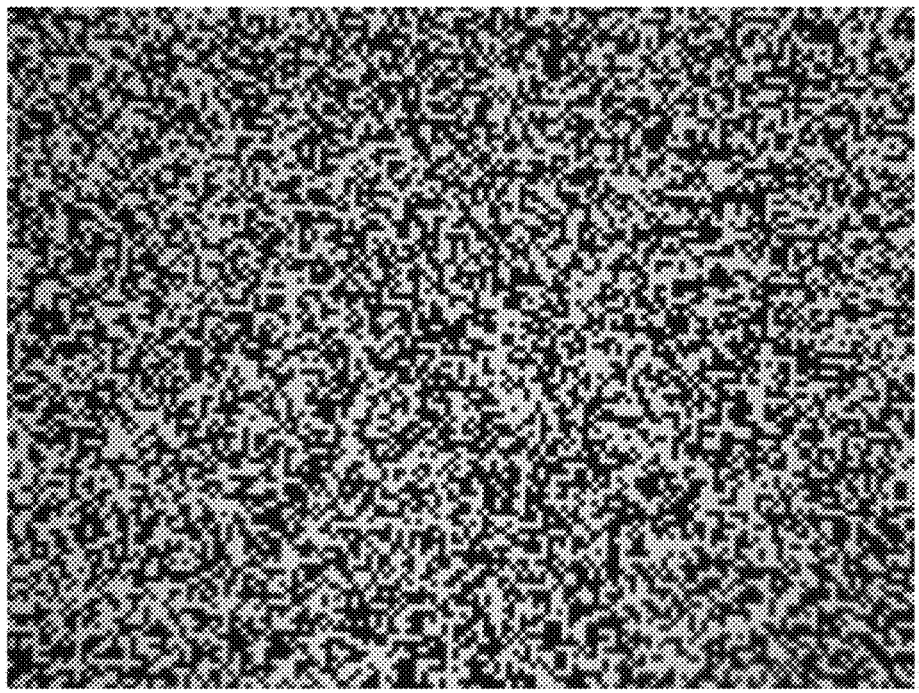
FIG. 1 is an image of a photomask used to form randomly aligned multiple domain layers.

In the first preferred embodiment of the present invention, an azo-dye based photo-alignment layer (A-PA) can be first coated onto a substrate. Polarized ultraviolet (UV) light can then be irradiated onto the substrate to provide a first preferred planar alignment direction for the liquid crystal. For purposes of discussion, this direction is defined as the x-direction. A photo mask with a designed pattern can then used as a template for exposing the substrate for a second time with polarized light. In the second exposure step the polarization direction of the linear polarized UV light is rotated by 90 degrees with respect to the first exposure. Due to the Azo cis-trans transition, the resulting alignment direction is therefore in a y-direction after the second step. An example of a photo mask design can be seen in FIG. 1.

The design principle of a photo mask is as follows: the entire mask can be divided into a matrix of N by N squares. The size of the squares can be L×L, with L ranging from 0.3 to 10 microns. For visible light operation of MDS devices, the optimal size of the mask-openings is 0.5 to 2 microns.

Figure 3:
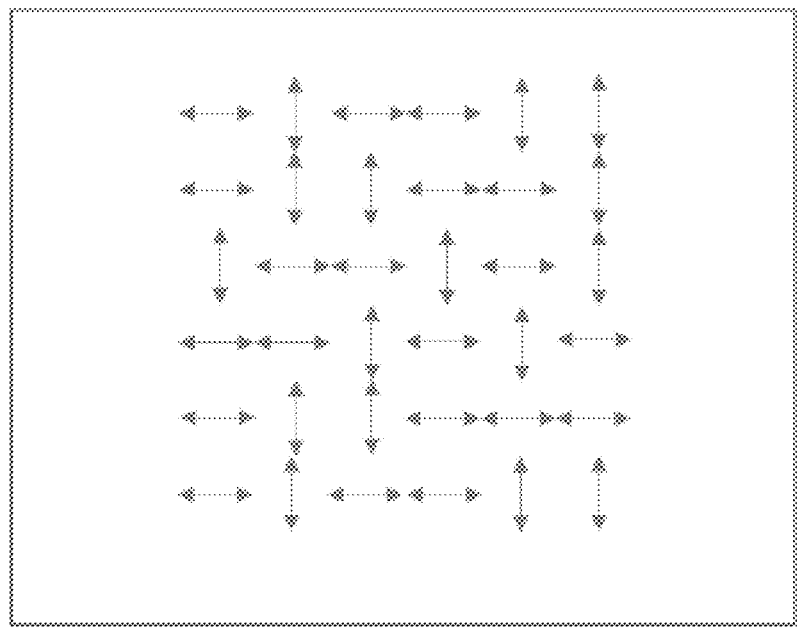
FIG. 3 is a diagram of the alignment of the top and bottom substrates from a liquid crystal cell.

As the azo-dye alignment molecules are rotated by the second polarized light exposure step, the alignment surface will consist of 2 types of domains. The domains from the first exposure step (aligned in x-direction) and those from the second exposure step (90 degree rotated, i.e. aligned in y-direction). This constitutes the first photo-aligned substrate. Examples of the alignment pattern can be seen in FIG. 3.

A second photo-aligned substrate can be made in the same manner. A liquid crystal cell can then made with these two substrates. In a preferred embodiment, the top and bottom substrates should be displaced by half a pixel square. This enables generating 4 different types of alignment patterns on the top and bottom substrates. Depending on the alignment direction of the top and bottom substrates, four types of liquid crystal domains with different elastic deformations are possible: (1) Planar-planar in the x-direction. This domain is a homogeneous x-direction domain. (2) Planar-planar in y-direction. This domain is a y-direction homogeneous domain. Top plate aligned along x-direction and bottom plate along y-direction. This gives either a (3) right-handed 90° twisted nematic, or a (4) left-handed 90° twisted nematic domain. Because Azo-type photo-alignment does not generate any pretilt angle to the liquid crystal, there is no way to distinguish left from right-handed twist. However, if the liquid crystal is doped with either a right-handed or a left-handed chiral dopant, one twist direction will be favored. Alternatively to Azo alignment, LPP-photo-alignment technology can be used. LPP-photo alignment technology enables simultaneous uniaxial and pre-tilt generation as well as simultaneous fixation of the alignment. In this case no chiral dopants are needed and only a single exposure step through a photo-mask is required for generating two different alignment patterns.

If the area of the square domain of a pixel on one substrate is L×L, the liquid crystal domain resulting from combining top and bottom substrate will be L/2×L/2. However, misalignment of the top and bottom substrates will result in pixel size variations. However, this does not affect the operation of the present invention.

Figure 6:
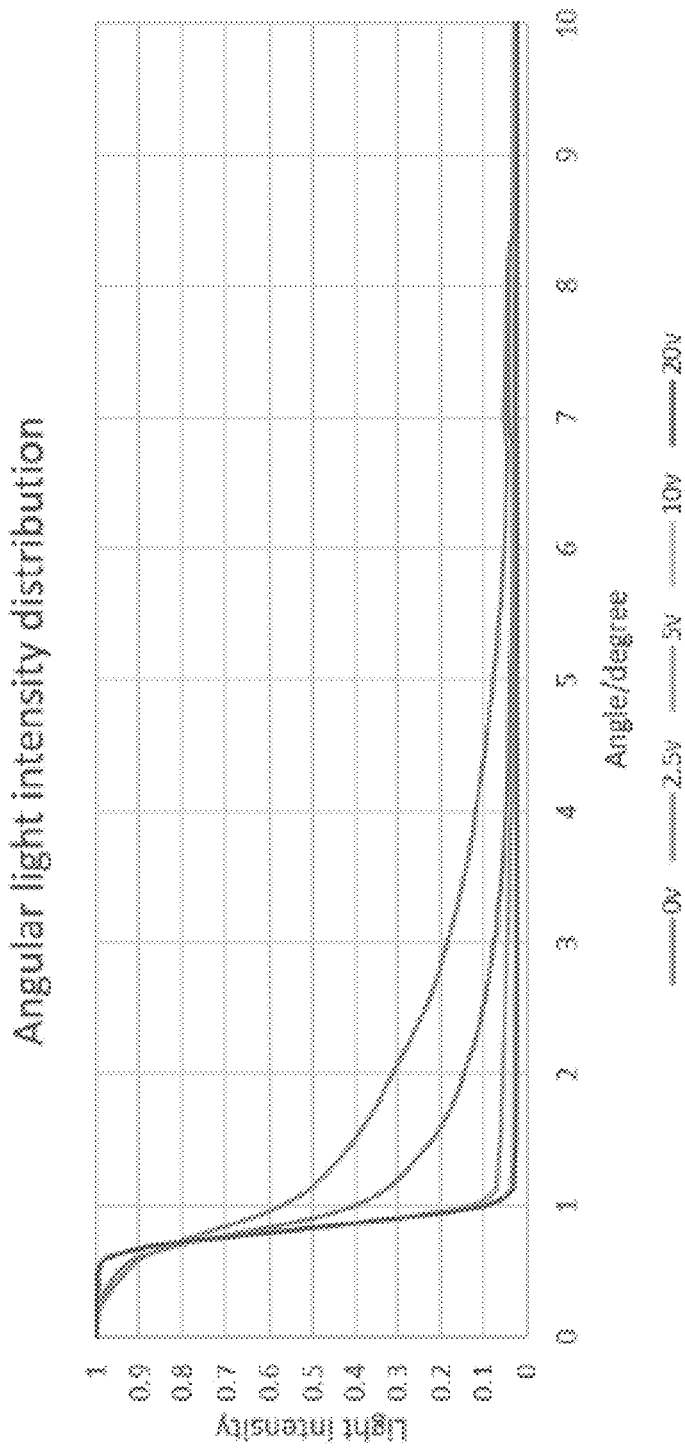
FIG. 6 is a plot of the measured angular distribution of the light-transmission of a cell with multiple domain structures with two planar random orientation patterns.

When no voltage or a small voltage is applied to an MDS-LCD comprising a basically planar aligned LC-configuration of the above type, light will be scattered or diffracted. This can be described by a scattering light distribution function $f(q)$ where q is the angle between light direction and normal to the LCD. FIG. 6 shows the measured angular distribution of light under various applied voltages for this embodiment. The curves are normalized to the peak value. At zero or small voltages it follows from FIG. 6 that the angular distribution is remarkably broad, indicating efficient scattering/diffraction. With increasing voltage narrowing of the angular intensity distribution occurs.

Figure 7:
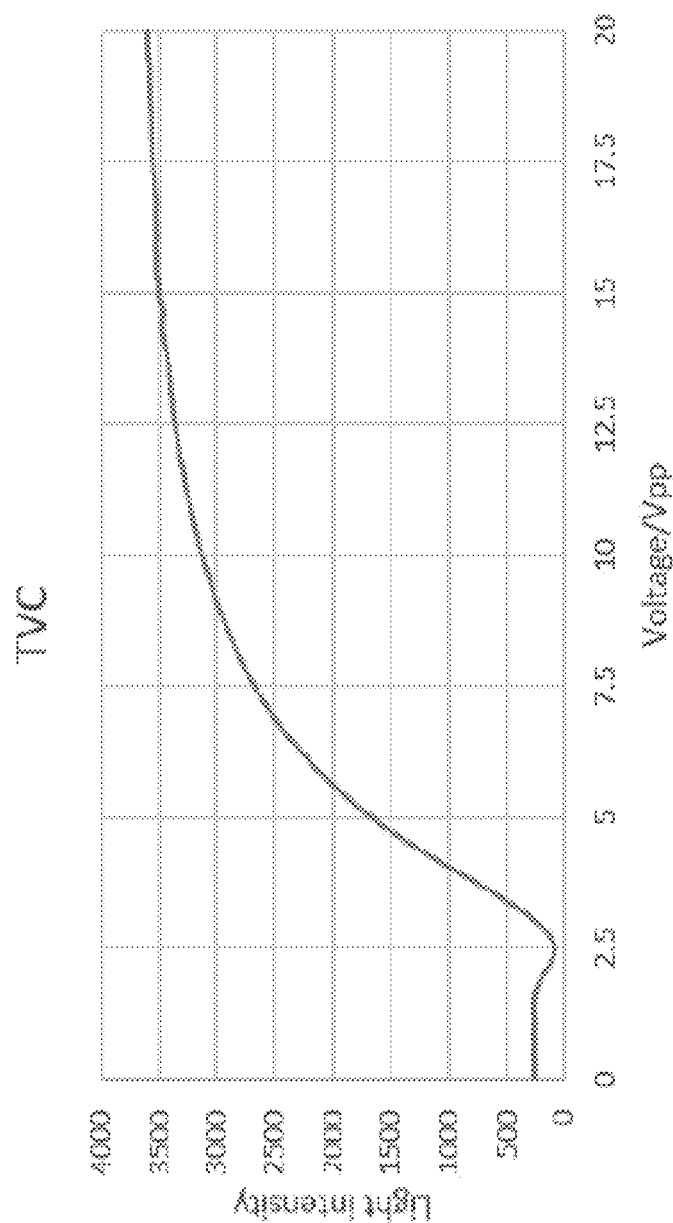
FIG. 7 is a plot of the on-axis transmission of light as a function of applied voltage.

At larger voltages, the angular distribution becomes narrow and scattering ceases; i.e. the MDS-device becomes fully transparent. The reason is that the liquid crystal molecules in the domains align vertically and the mismatch of the refractive index between the domains disappears. FIG. 7 shows the on-axis transmission for a collimated laser input beam as a function of applied voltage. At small voltages strong scattering/diffraction results in low transmission. Scattering diminishes with increasing voltage and transmission increases. FIG. 7 shows that very large DMS contrast ratios can be achieved. However, in practice, incident light is not collimated, but covers a finite cone angle. With an increasing angle of view and small applied voltages light scattering/diffraction of DMS devices causes the signal to increase, thus reducing the contrast ratio. For a 5 degree collection angle, the contrast decreases to 50:1. Combined with the small DSM operating voltage and compared with other liquid crystal scattering devices such as PDLCs this is a desired figure. Moreover, the slope of the transmission curve in FIG. 7 is much sharper and much more reproducible than that of PDLCs, demonstrating its passive multiplexability. Unlike PDLCs it is possible to drive MDS-LCDs by the active matrix method. It should be noted that the transmission in FIG. 7 exhibits a minimum at 2.5V instead of 0V. This shift could be due to a residual optical retardation of the liquid crystal layer affecting scattering/diffraction of the device.

Figure 8A:
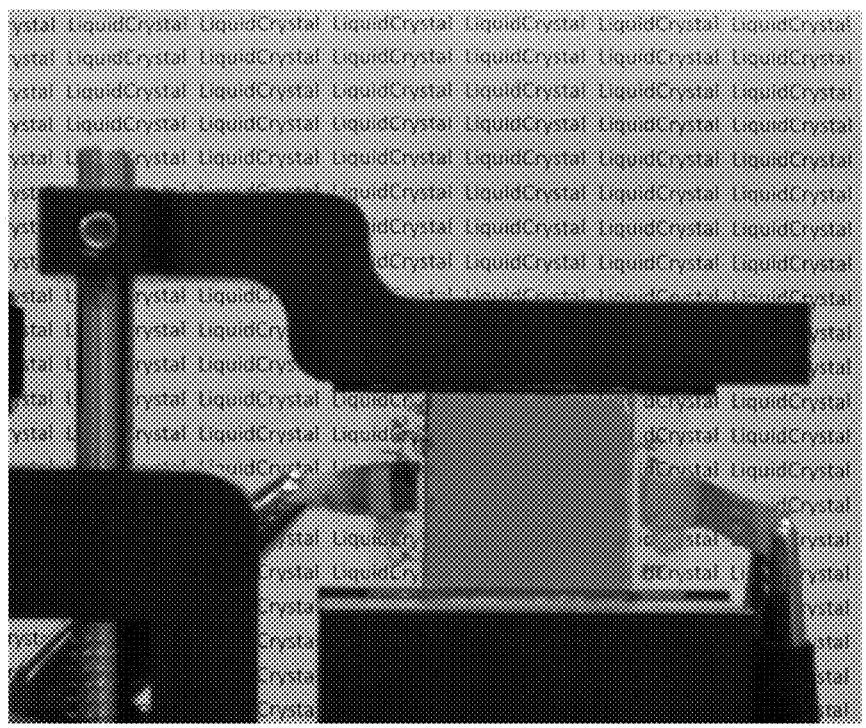
FIG. 8a is an image of text behind a glass sample under an applied voltage.
Figure 8B:
FIG. 8b is an image of text behind a glass sample with no voltage.

FIG. 8 shows photographs of text in front of a MDS liquid device at high driving voltage of 15V and low driving voltage (2.5V), respectively. The voltages correspond with the clear- and scattering opaque states, respectively. As follows from their scattering contrast, MDS devices are candidates for smart window and privacy screen applications. The transmission contrast renders DMS devices also candidates for projection applications. In certain embodiments of the subject invention, dichroic dyes can be added to either positive or negative dielectric anisotropic liquid crystal hosts. Adding dichroic dyes enables a polarizer free guest-host LCD with high contrast and brightness. Due to the light scattering properties of MDS-configurations and the quasi random director distribution, the dyes in guest-host nematic liquid crystal mixtures can absorb light in the MDS scattering state, whereas high light transmission (brightness) results in the uniaxial aligned state. This holds for planar aligned guest-host MDS-LCDs as well as for vertically aligned displays. In the former case the dielectric anisotropy of the host is positive dielectric anisotropic and the MDS configuration is basically planar, whereas negative hosts can be used in vertical aligned MDS configurations. A guest-host mixture with negative dielectric anisotropy operated in a vertically aligned multi-domain DSM-LCD exhibits maximal light absorption in the voltage off-state and maximal transmission (brightness) in the voltage on-state. The opposite holds for planar aligned MDS-LCDs comprising a positive dielectric guest host mixture.

Figure 2:
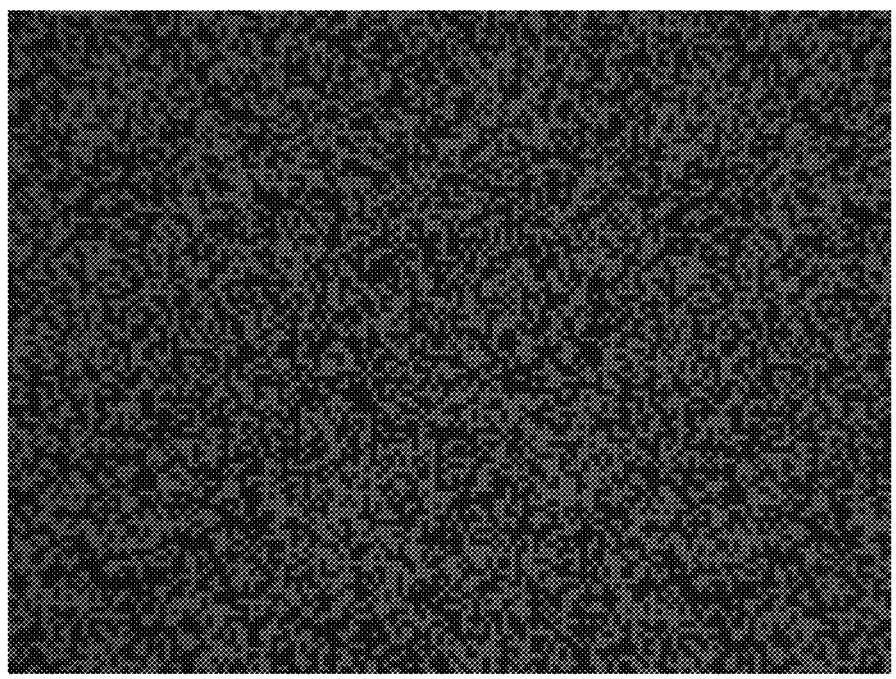
FIG. 2 is an image of a photomask used to from randomly aligned multiple domains. The transmission regions are circles.

In another embodiment of the subject invention, different patterns for the photo mask can be used. Instead of a square pattern, tiled or hexagonal patterns can be used. In fact any geometrical pattern can be used for generating multi-domains in MDS devices. A patterned mask for fabricating the MDS device can be seen in FIG. 2. The transmission patterns are circles instead of squares.

In another embodiment of the present invention, the exposure conditions of the first preferred embodiment as describe above are varied. More liquid crystal domains are possible with more than 2 polarized UV-light exposures. It is possible to add a third and fourth exposure step in different directions of UV polarization.

The procedure for adding additional polarized UV-light exposures is similar to the first embodiment. A first linear polarized photo-alignment exposure is along the planar x-axis. Then, a second exposure is made via the photo mask with the light polarized along 60° degrees off from the x-direction, yielding a second set of alignment domains. Then using the same photo mask again, but simply translating the mask by a fraction of a domain, a third exposure can be made with the polarization rotated by another 60°(i.e. 120° from the x-axis). Thus, 3 types of domains result with the alignment pointing in 3 different directions. The LC cell can then be assembled as disclosed in the first embodiment.

Figure 4:
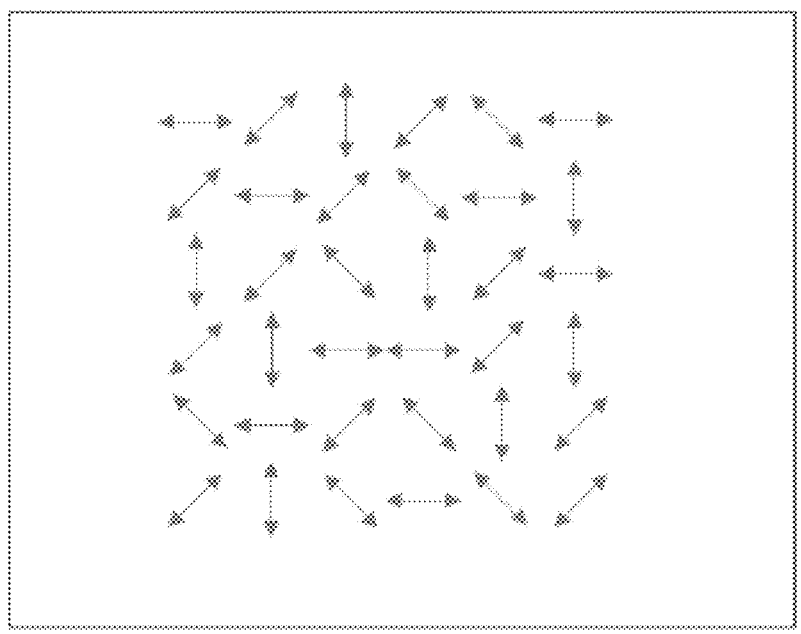
FIG. 4 is a diagram of the alignment of the top and bottom substrates form a liquid crystal shell.
Figure 5:
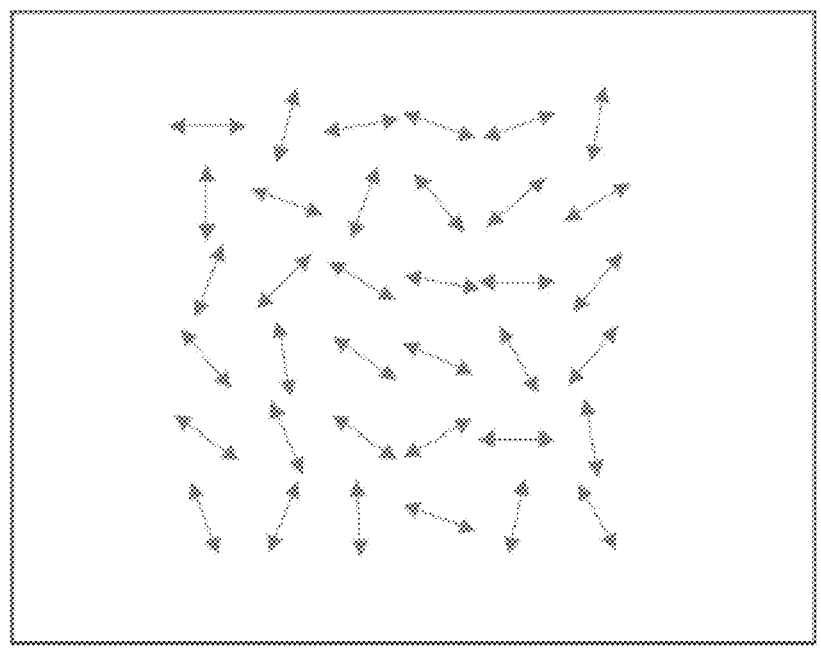
FIG. 5 is a diagram of the alignment of the top and bottom substrates form a liquid crystal shell.

It exhibits 5 different LC-configuration domains: planar in x-direction, planar 60° off from the x-axis, planar 120° degrees off from the x-axis, 60° right-handed twist, and left-handed 60° twist. In another embodiment, fabrication can include 4 different exposures, at angles of 0°, 45°, 90°, and 135° can be seen in FIG. 3. FIG. 4 shows another domain structure with 6 domains arising from 6 exposures.

In another embodiment of the present invention, an alignment layer providing vertical alignment is employed. This vertical alignment layer can have a small off-vertical pre-tilt angle of less than 85° with respect to the plane of the substrate. The LC used should exhibit negative dielectric anisotropy such that when a sufficiently high voltage is applied, the LC molecules tilt in the pre-tilt determined preferred direction until they are parallel to the plane of the substrate. This is similar to a multi-domain vertical alignment (MVA) LCD. But in this case, the multi domains are not regularly tilted. Instead, the tilt directions of the domains are designed to be random. That is, the randomness is designed into the display instead of formed upon voltage application. Similar to the first embodiment, we use a photo mask to produce the multiple domains where the photo mask can exhibit a square, tiled, or hexagonal structure. A quasi random tilt direction is assigned to each partition of the structure. The method of forming the multiple domains of alignment, and the multiple domains of the LC partitions, are similar to embodiment 1. There can be 4 types of vertical domains: (1) those that tilt in x-direction when a voltage is applied, (2) those tilting in y-direction, and those forming (3) right- and (4) left-handed twist domains upon voltage application. In this embodiment, the LC cell is clear (transmissive) when no voltage is applied because all domains are basically vertically aligned, with a small tilt angle between them. However, upon application of a sufficiently high voltage the LC molecules in the different domains tilt in the predetermined (random) directions. In this state, the MDS-LCD is scattering or diffracting light. The operation of this embodiment is therefore opposite to that of the first embodiment, being clear (transmissive) at no or low voltages and scattering at high voltages. Analogous to the above planar case, LPP-photo-alignment generating slightly off-vertical multi-domain configuration can be used for designed slightly off-vertical alignment patterns; where different bias tilt directions result from changing the direction of incident polarized UV-light.

In other embodiments of the subject invention, the exposure conditions can be varied to use more than 2 exposure steps through the photo mask. This will give more than 4 LC domain configurations. As well, guest-host dichroic dyes with large order parameter can be added to MDS LC-materials enabling polarizer-free, high contrast and bright guest-host LCDs.

Embodiment of the subject invention provide a polarizer-free liquid crystal electro-optical field-effect device based on light scattering and diffraction generated by photo-patterned, multi-domain liquid crystal alignment. The device comprises a liquid crystal cell with two substrates, wherein at least one substrate comprises a liquid crystal alignment layer. An alignment layer can have a multi-domain alignment structure, with the domains having basically planar or basically vertical LC-aligning directions. In another embodiment an alignment layer can have a multi-domain alignment structure, with the domains having one of randomly oriented basically planar or basically vertical LC-aligning directions, in which one said alignment layer has a basically planar alignment, while the other alignment layer has a basically vertical alignment. In another embodiment one substrate comprises a multi-domain alignment configuration and the other substrate comprises a basically uniformly planar or uniformly vertical alignment. The domains can be smaller than ten microns and larger than 0.3 microns in their longest dimension. In one embodiment the liquid crystal has a positive anisotropy and at least one substrate has a basically planar LC-alignment. In another embodiment, the liquid crystals have a negative dielectric anisotropy and at least one substrate has a basically vertical LC-alignment. The electrodes can be affixed to the substrates so that a voltage can be applied to the liquid crystal cell, of which at least one electrode is transparent and/or patterned.

In another embodiment a liquid crystal electro-optical field-effect device is based on light scattering and/or diffraction and/or liquid crystal director variations by a photo-patterned multi-domain configuration. The device comprises a liquid crystal cell with two substrates with alignment layers and at least one said alignment layer having a multi-domain alignment structure, with the domains having randomly one of at least two oriented near vertical alignment directions. The domains can be smaller than ten microns and larger than 0.3 microns in their longest dimension. The liquid crystal can have a negative anisotropy. Electrodes can be affixed on a substrate of which at least one electrode is transparent and/or patterned so that a voltage can be applied to the said liquid crystal cell.

Another embodiment provides a liquid crystal electro-optical field-effect device based on light scattering and/or diffraction and/or liquid crystal director variations by a photo-patterned multi-domain configuration. The device comprises a liquid crystal cell with two substrates having alignment layers, at least one of the alignment layers having a multi-domain structure. The domains can have randomly one of at least two liquid crystal aligning directions, at least one said alignment layer having a multi-domain structure, with the domains having randomly one of at least two planar aligning directions. The said domains can be smaller than ten microns and longer than 0.3 microns in their longest dimension. Electrodes can be affixed onto a substrate so that a voltage can be applied to the said liquid crystal cell where at least one electrode is transparent. At least one of the electrodes can be pixelated to form a pixelated display enabling pixel selective addressing. The electrodes can be a continuous layer to form a light control device.

The liquid crystal can comprise a nematic liquid crystal, cholesteric liquid, or smectic liquid crystal. The liquid crystal can comprise one or more dichroic dyes in a guest-host mixture.

A multi-domain structure can be fabricated by the following photo-alignment process. A first photo-alignment layer can be applied on a substrate. The entire alignment layer can be aligned in one planar direction by exposing the layer to polarized light in a first direction without a photo-mask. Specific regions of the alignment layer can be exposed to light of a different polarization through a mask, with this step applied at least once or repeated, where in each exposure the light is polarization in a different planar direction, thus forming a multi-domain alignment layer. In a certain embodiment of the subject invention, the multi-domain alignment structure is made with an azo dye mixture. The multi-domain alignment structure can also be made with an azo dye mixture with a liquid crystal polymer layer on top, with the said liquid crystal polymer layer having a planar alignment. In another embodiment, the multi-domain alignment structure can be made with an azo dye mixture with a liquid crystal polymer layer on top, with the said liquid crystal polymer layer having a hybrid alignment with a basically vertical alignment on the outside surface. In one embodiment, the multi-domain alignment structure in claim can be made with a mixture of azo dye and a liquid crystal polymer which can be cured by ultraviolet light exposure or thermally.

The multi-domain structure can also be fabricated by applying a first photo-alignment layer on the substrate photo-aligning the entire alignment layer via a photo-mask in a given planar azimuthal direction under a zenithal angle of incident polarized UV-light between 0 and 90 degrees. The photomask can be removed and either the entire alignment layer or parts of it a second time can be exposed to polarized UV-light whose azimuthal or zenithal polarization direction differs from the polarization direction in the first exposure. The multi-domain alignment structure can be made with a linear photo-polymer (LPP)-photo-alignment material. In another embodiment the multi-domain alignment structure can be made with a linear photo-polymer (LPP)-material with a liquid crystal polymer layer on top.

The device can operate using reflection and comprise either a light absorbing or a metallic reflector. In case of a guest-host configuration a diffuse reflecting background can be used. To prevent unwanted reflections from a metallic reflector, a circular polarizer can be placed on the device. To correct residual optical retardation effects, optical retarders can be placed or integrated into the MDS-device.

The subject invention includes, but is not limited to, the following exemplified embodiments.

Embodiment 1

A liquid crystal electro-optical field-effect device, the device comprising:

a liquid crystal cell comprising two substrates; and at least one electrode electrically connected to at least one of the substrates, wherein the electrode is transparent and/or patterned, and wherein at least one substrate comprises a liquid crystal alignment layer having a multi-domain liquid crystal alignment.

Embodiment 2

The device of embodiment 1, wherein the domains have at least one of a basically planar or a basically vertical LC-aligning direction.

Embodiment 3

The device of embodiment 1, wherein each substrate is a liquid crystal alignment layer, and wherein one liquid alignment layer has a basically planar alignment and the other liquid crystal alignment layer has a basically vertical alignment.

Embodiment 4

The device of embodiment 1, where each substrate is a liquid crystal alignment layer, wherein one liquid crystal alignment layer has a multi-domain alignment configuration, and wherein the other liquid crystal alignment layer has either a basically planar alignment configuration or a basically vertical alignment configuration.

Embodiment 5

The device of any of embodiments 1-4, wherein the longest dimension of the domains is in a range of from 0.3 to 10 μm.

Embodiment 6

The device of embodiment 1, wherein liquid crystals in the liquid alignment layer have positive anisotropy and the liquid alignment layer has a basically planar LC-alignment.

Embodiment 7

The device of embodiment 1, wherein liquid crystals in the liquid crystal alignment layer have negative dielectric anisotropy and the liquid crystal alignment layer has basically vertical LC-alignment.

Embodiment 8

The device of any of embodiments 1-7, wherein liquid crystal in the liquid crystal alignment layer is nematic, cholesteric, or smetic liquid crystal.

Embodiment 9

The device of any of embodiments 1-8, further comprising one or more dichroic dyes in a guest-host mixture.

Embodiment 10

The device of any of embodiments 1-9, wherein the electrode is pixelated to form a pixelated display enabling pixel selective addressing.

Embodiment 11

The device of any of embodiments 1-10, wherein the electrode is a continuous layer forming a light control device.

Embodiment 12

A method of fabricating multi-domain alignment structure, the method comprising:
    applying a photo-alignment layer to a substrate;
    aligning the entire photo-alignment layer in a planar direction by exposing the photo-alignment layer to polarized light; and
    exposing a plurality of regions of the photo-alignment layer to polarized light through a photo-mask;
    wherein each region is respectively exposed to polarized light in a different planar direction.

Embodiment 13

The method of embodiment 12, wherein the photo-alignment layer comprises an azo dye structure, wherein a liquid crystal polymer layer is disposed on the surface of the azo dye structure, and wherein the liquid crystal polymer layer has a planar alignment.

Embodiment 14

The method of embodiment 12, wherein the photo-alignment layer comprises an azo dye structure, wherein a liquid crystal polymer layer is disposed on the surface of the azo dye structure, and wherein the liquid crystal polymer layer has a hybrid alignment having a basically vertical alignment on its surface.

Embodiment 15

The method of embodiment 12, wherein the photo-alignment layer comprises an azo dye structure, wherein a liquid crystal polymer layer is disposed on a top surface of the azo dye structure, and wherein the liquid crystal polymer layer is cured by ultraviolet light exposure.

Embodiment 16

The method of embodiment 12, wherein the photo-alignment layer comprises an azo dye structure, wherein a liquid crystal polymer layer is disposed on a top surface of the azo dye structure, and wherein the liquid crystal polymer layer is cured thermally.

Embodiment 17

A method of fabricating a multi-domain alignment structure, the method comprising:
    applying a photo-alignment layer to a substrate;
    aligning the entire photo-alignment layer in a planar direction by exposing the photo-alignment layer to polarized light through a photomask in a first planar azimuthal direction under a first zenithal angle of incident polarized light between 0° and 90°; and
    removing the photomask and exposing at least a portion of the photo-alignment layer to polarized light in a second planar azimuthal direction under a second zenithal angle,
    wherein either the second planar azimuthal direction is different than the first azimuthal direction or the second zenithal angle is different than the first zenithal angle.

Embodiment 18

The method of embodiment 17, wherein the portion of the photo-alignment layer exposed to polarized light is the entire photo-alignment layer.

Embodiment 19

The method of any of embodiments 17-18, wherein the photo-alignment layer comprises a linear photo-polymer (LPP)-photo alignment material.

Embodiment 20

The method of any of embodiments 17-18, wherein the photo-alignment layer comprises a linear photo-polymer (LPP) material, and a liquid crystal polymer layer is disposed on a top surface of the linear photo-polymer (LPP) material.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] H S Kwok, S Naemura, H L Ong, Progress in Liquid Crystal Science and Technology, 716 pp, World Scientific, Singapore, 2013.
[2] D Coates, Development and Application of Cholesteric Liquid Crystals, Liquid Crystals, 42:5-6, 653-665, 2015.
[3] Wei Ji, Liang-Yu Shi, Hong Tang, Gang Sun, Wei Hu and Xiao Liang, Large birefringence smectic-A liquid crystals for high contrast bistable displays, Optical Materials Express, vol 5, p 281, 2015.
[4] V G Chigrinov, V Kozenkov and H S Kwok, Photoalignment of Liquid Crystalline Materials, Physics and Applications, 240 pp, Wiley Inter-Science, New York 2008.
[5] M. Schadt, H. Seiberle and A. Schuster: Optical Patterning of Multi-Domain Liquid Crystals with Wide Viewing Angle. Nature 381 (1996) 212-215.

What is claimed is:

1. A liquid crystal electro-optical field-effect device having no polarizer, the device comprising:
    a liquid crystal cell comprising two substrates; and
    at least one electrode electrically connected to at least one of the substrates,
    wherein the liquid crystal electro-optical effect device does not comprise a polarizer;
    wherein the electrode is transparent and/or patterned,
    wherein at least one substrate comprises a liquid crystal alignment layer having a multi-domain liquid crystal alignment configured to have quasi-random multiple domains having different predetermined randomness in orientations of the multiple domains; and
    wherein when a first driving voltage is applied to the liquid crystal alignment layer, the liquid crystal alignment layer is configured to scatter or diffract light incident to the liquid crystal alignment layer, and when a second driving voltage is applied to the liquid crystal alignment layer, the liquid crystal alignment layer is configured to transmit the light incident to the liquid crystal alignment layer, wherein the second driving voltage is smaller than the first driving voltage.

2. The device of claim 1, wherein the domains have either a planar or a vertical LC-aligning direction.

3. The device of claim 1, wherein each substrate is a liquid crystal alignment layer, and wherein one liquid alignment layer has a planar alignment and the other liquid crystal alignment layer has a vertical alignment.

4. The device of claim 1, wherein each substrate is a liquid crystal alignment layer, wherein one liquid crystal alignment layer has a multi-domain alignment configuration, and wherein the other liquid crystal alignment layer has either a planar alignment configuration or a vertical alignment configuration.

5. The device of claim 1, wherein the longest dimension of the domains is in a range of from 0.3 to 10 μm.

6. The device of claim 1, further comprising liquid crystals aligned by the liquid alignment layer, wherein the liquid crystals have positive anisotropy and the liquid alignment layer has a planar LC-alignment.

7. The device of claim 1, further comprising liquid crystals aligned by the liquid crystal alignment layer, wherein the liquid crystals have negative dielectric anisotropy and the liquid crystal alignment layer has a vertical LC-alignment.

8. The device of claim 1, further comprising liquid crystal aligned by the liquid crystal alignment layer, wherein the liquid crystal is nematic, cholesteric, or smetic liquid crystal.

9. The device of claim 1, further comprising one or more dichroic dyes in a guest-host mixture.

10. The device of claim 1, wherein the electrode is pixelated to form a pixelated display enabling pixel selective addressing.

11. The device of claim 1, wherein the electrode is a continuous layer forming a light control device.

* * * * *